United States Patent [19]

Tokuda et al.

[11] Patent Number: 5,633,060
[45] Date of Patent: May 27, 1997

[54] OPTICAL DISK SUBSTRATE, OPTICAL DISK AND AROMATIC POLYCARBONATE RESIN

[75] Inventors: Toshimasa Tokuda, Iyo; Kuniyuki Hayashi, Matsuyama; Tatsumi Horie, Iyo, all of Japan

[73] Assignee: Teijin Chemicals, Ltd., Tokyo, Japan

[21] Appl. No.: 491,579

[22] Filed: Jun. 16, 1995

[30] Foreign Application Priority Data

| Jul. 8, 1994 | [JP] | Japan | 6-157726 |
| Jul. 12, 1994 | [JP] | Japan | 6-160043 |
| Mar. 8, 1995 | [JP] | Japan | 7-048779 |
| Mar. 8, 1995 | [JP] | Japan | 7-048780 |
| Apr. 21, 1995 | [JP] | Japan | 7-097085 |

[51] Int. Cl.$^6$ .................................................. B32B 3/00
[52] U.S. Cl. ............... 428/64.1; 428/648; 428/412; 428/913; 369/288; 525/462; 525/469
[58] Field of Search ....................... 428/64.1, 64.2, 428/64.4, 64.8, 913, 412; 525/462, 469; 430/495.1, 945; 369/283, 288

[56] References Cited

U.S. PATENT DOCUMENTS

| 5,126,428 | 6/1992 | Freitag et al. | |
| 5,132,154 | 7/1992 | Westeppe et al. | 428/65 |
| 5,227,458 | 7/1993 | Freitag et al. | |
| 5,426,159 | 6/1995 | Umemura | 525/468 |
| 5,554,473 | 9/1996 | Cais et al. | 430/59 |

*Primary Examiner*—Patrick Ryan
*Assistant Examiner*—Elizabeth Evans
*Attorney, Agent, or Firm*—Sherman and Shalloway

[57] ABSTRACT

An optical disk substrate formed substantially of an aromatic polycarbonate from an aromatic dihydroxy component containing at least 20 mol % of 1,1-bis(4-hydroxyphenyl)-3,3,5-trimethylcyclohexane, wherein:
(A) the aromatic polycarbonate has a specific viscosity of 0.2 to 0.5,
(B) the aromatic polycarbonate shows a water absorption percentage of 0.2 % by weight or less,
(C) the aromatic polycarbonate has an oligomer content of 10 % or less, and
(D) the number of undissolved particles having a diameter of 0.5 μm or greater is 25,000 pieces or less per g of the polycarbonate resin, and the number of undissolved particles having a diameter of 1 μm or greater is 500 pieces or less per g of the polycarbonate resin, and an optical disk from the above substrate.

34 Claims, No Drawings

OPTICAL DISK SUBSTRATE, OPTICAL DISK AND AROMATIC POLYCARBONATE RESIN

DETAILED DESCRIPTION OF THE INVENTION

1. Field of the Invention

The present invention relates to an optical disk substrate. More specifically, it relates to a substrate suitable for optical recording media such as a magneto-optic disk and a digital video disk. In particular, the present invention relates to an optical disk substrate suitable for a digital video disk having a greatly large storage capacity. Further, the present invention also relates to an aromatic polycarbonate resin that can be advantageously used for the production of optical disk substrates.

2. Prior Art of the Invention

As a typical resin used for the production of a substrate for a compact disk, there is known a polycarbonate resin obtained by reacting 2,2-bis(4-hydroxyphenyl)propane (generally called "bisphenol A") with phosgene or diphenyl carbonate. This polycarbonate resin has excellent properties, i.e., excellent transparency, heat resistance and dimensional stability, so that in recent years it is widely used as a raw material for a substrate for information recording media in the field of optical disks. However, the above polycarbonate resin from bisphenol A has a large stress optical coefficient due to the optical anisotropy of its benzene ring, and it therefore has a defect in a large birefringence. The above polycarbonate resin is therefore demanded to be improved in this point. Further, the skew of the disk is becoming very important because of the tendency toward the formation of a higher-density substrate, and there is therefore demanded a substrate of a polycarbonate resin of which the deflection is further decreased.

For increasing the recording density, a resin capable of giving higher mold surface reproduction is demanded. On the other hand, a highly durable resin is also demanded, while there is no substrate for an optical disk which can satisfy these demands.

On the other hand, compact disks for video have been recently and are being developed. For this purpose, the storage capacity thereof is required to be at least about 10 times as large as that of a compact disk for audio, and further, the compact disk is also demanded to have far advanced properties.

European Patent 0859953B1 (corresponding to U.S. Pat. Nos. 5126428 and 5227458) discloses a dihydroxydiphenyl alkane having a specific structure, a novel aromatic polycarbonate therefrom and a process for the production thereof. Typically, the above European Patent discloses an aromatic polycarbonate produced from a dihydroxy component containing 100 to 2 mol % of 1,1-bis(4-hydroxyphenyl)-3,3,5-trimethylcyclohexane. Specifically, it discloses homo- or copolycarbonates from 1,1-bis(4-hydroxyphenyl)-3,3,5-trimethylcyclohexane in an amount of 100 to 30 mol %, and in the case of the copolymers, bisphenol A is used in an amount of 30, 50, 65 or 70 mol %.

The above European Patent discloses that the above aromatic polycarbonate can be used in the fields of a conventional polycarbonate such as the fields of electric products, coatings and transparent sheet glass and that it has excellently high heat resistance. In particular, a sole Example shows the use of the above aromatic polycarbonate for a compact disk, and this Example describes that a copolycarbonate from 65 mol % of bisphenol A and 35 mol % of 1,1-bis(4-hydroxyphenyl)-3,3,5-trimethylcyclohexane has a higher glass transition temperature (Tg) than a conventional polycarbonate from bisphenol A, or that the above copolycarbonate has a glass transition temperature (Tg) of as high as 185° C. and that the path difference (nm/mm) is +13. It is suggested that the above copolycarbonate is improved in heat resistance over a conventional polycarbonate from bisphenol A, but it is not at all taught that the above copolycarbonate is excellent in other properties for a compact disk.

SUMMARY OF THE INVENTION

The first object of the present invention is to provide an optical disk substrate of an aromatic polycarbonate resin which retains the excellent transparency, heat resistance and mechanical properties of a polycarbonate resin suitable for an optical disk, and which is improved in retardation depending on incident angle, water absorption percentage, mold surface reproduction and deflection.

The second object of the present invention is to provide a substrate for an optical disk having high-density storage capacity, in particular, a substrate which has high functions suitable for an optical disk substrate for video and which can be easily produced by melt molding.

The third object of the present invention is to provide a novel modified aromatic polycarbonate resin which can be advantageously used as a raw material for the above optical disk and which can be also used as a raw material for other film and sheet.

The present inventors have made diligent studies for achieving the above objects, and as a result have found that an excellent optical information recording medium substrate, which can attain excellent mold surface reproduction and is free of deflection, can be obtained from an aromatic polycarbonate resin having a specific structure, having a specific viscosity in a specific range, having a content of a low molecular weight oligomer in a specific range, having a specific content of particles undissolved in methylene chloride and having a low water absorption percentage.

According to the studies of the present inventors, the above objects and advantages of the present invention are achieved, first, by an optical disk substrate formed substantially of an aromatic polycarbonate resin from an aromatic dihydroxy component containing at least 20 mol % of 1,1-bis(4-hydroxyphenyl)-3,3,5-trimethylcyclohexane, wherein:

(A) the aromatic polycarbonate resin has a specific viscosity of 0.2 to 0.5 when measured in a solution of 0.7 g of the aromatic polycarbonate resin in 100 ml of methylene chloride at 20° C., (B) the aromatic polycarbonate resin shows a water absorption percentage, defined in the present specification, of 0.2% by weight or less, (C) the aromatic polycarbonate resin has an oligomer content, measured by the method defined in the present specification, of 10% or less, and (D) the number of undissolved particles having a diameter of 0.5µm or greater is 25,000 pieces or less per g of the polycarbonate resin, and the number of undissolved particles having a diameter of 1 µm or greater is 500 pieces or less per g of the polycarbonate resin when the aromatic polycarbonate is measured in a methylene chloride solution.

Further, according to the studies of the present inventors, the above objects and advantages of the present invention are achieved, second, by an aromatic polycarbonate resin (1) which is from an aromatic dihydroxy component containing at least 20 mol % of 1,1-bis(4-hydroxyphenyl)-3,3,5-trimethylcyclohexane, (2) which has a specific viscosity of 0.2 to 0.5 when measured in a solution of 0.7 g of the aromatic polycarbonate in 100 ml of methylene chloride, and (3) which has a water absorption percentage, defined in the present specification, of 0.2% by weight or less.

The aromatic polycarbonate resin for forming the optical disk substrate of the present invention is required to be an aromatic polycarbonate resin from an aromatic dihydroxy component containing at least 20 mol %, based on the total aromatic hydroxy component amount, of 1,1-bis(4-hydroxyphenyl)-3,3,5-trimethylcyclohexane (to be sometimes referred to as "bisphenol TMC" hereinafter).

As already described, European Patent 0359953B1 discloses an aromatic polycarbonate resin from bisphenol TMC alone as a dihydroxy component or an aromatic copolycarbonate resin from bisphenol TMC and other dihydroxy compound.

However, the studies of the present inventors have revealed that the aromatic polycarbonate resin from bisphenol TMC alone as a dihydroxy component does not satisfy all the above requirements (A) to (D) in the present invention, and is improper for an optical disk substrate. It has been also revealed that the copolymer specifically disclosed in the above European Patent 03599531B, i.e., a copolycarbonate resin from bisphenol TMC and bisphenol A, does not satisfy any one of the above requirements (A) to (D) without having anything to do with the proportions of the raw materials used for the copolymerization, and that the above copolymer cannot be said to be particularly excellent over a conventional substrate of a polycarbonate resin except that it is improved in heat resistance.

Meanwhile, according to the studies of the present inventors, an aromatic polycarbonate resin obtained by the copolymerization of bisphenol TMC together with a specific amount of either a specific chain end-modifier or a dihydroxy compound having a specific structure gives a substrate showing a very small water-absorption percentage and is almost free from deflection as one for an optical disk.

The aromatic polycarbonate resin of the present invention will be explained hereinafter.

The aromatic polycarbonate resin used as a raw material for the optical disk substrate of the present invention is a product from an aromatic dihydroxy component containing at least 20 mol % of 1,1-bis(4-hydroxyphenyl)-3,3,5-trimethylcyclohexane (bisphenol TMC).

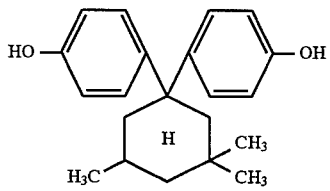

In the aromatic polycarbonate resin of the present invention, the amount of the above bisphenol TMC based on the total aromatic dihydroxy component amount is at least 20 mol %, preferably at least 30 mol %. When the above amount of the bisphenol TMC is less than 20 mol %, the optical disk substrate obtained from the aromatic polycarbonate resin is unsatisfactory in some of the properties of transparency, heat resistance, mechanical properties, retardation depending on incident angle, water absorption percentage, mold surface reproduction and deflection, and there can be obtained no optical disk substrate or optical disk that can satisfy all the above properties. The bisphenol TMC may be used in an amount of 100 mol %, while in this case, the water absorption percentage is liable to increase or the fluidity is liable to be poor. When the amount of the bisphenol TMC is as large as 100 mol %, therefore, it is desirable that the polycarbonate be terminal-modified with a specific chain end modifier as will be described later.

For the production of the aromatic polycarbonate resin of the present invention, the aromatic dihydroxy component is required to contain the above-specified amount of the bisphenol TMC. For achieving the desired properties, particularly, a water absorption percentage of 0.2% by weight or less, preferably 0.18% by weight or less, there are, largely classified, two means to be taken. One means is to combine the bisphenol TMC with a specific dihydroxy component for producing a copolycarbonate resin. The other means is to introduce a chain end modifier having a specific structure to the chain end of the polycarbonate resin. The above two means may be employed alone or in combination.

For the production of the aromatic polycarbonate resin of the present invention, the amount of the bisphenol TMC based on the total aromatic dihydroxy component amount is preferably in the range of from 30 to 90 mole %, particularly preferably in the range of from 40 to 80 mol %.

According to the studies of the present inventors, it has been found that a copolycarbonate resin from a combination of the above bisphenol TMC with a specific dihydroxy component is particularly suitable as a raw material for an optical disk. That is, as a raw material for an optical disk substrate, particularly preferred is a copolycarbonate resin from an aromatic dihydroxy component which contains (a) bisphenol TMC (to be sometimes referred to as "component a" hereinafter) and (b) one or both of 4,4'-(m-phenylenediisopropylidene)diphenol (to be sometimes referred to as "bisphenol M" hereinafter) and 2,2-bis(3-methyl-4-hydroxyphenyl)propane (to be sometimes referred to as "bisphenol C" hereinafter) [bisphenol M and bisphenol C to be referred to as "component b" hereinafter], in which the total amount of the components a and b is at least 80 mol % based on the total aromatic dihydroxy component amount and the molar ratio of the component a:component b is 20:80 to 80:20.

One of the preferred embodiments of the above copolycarbonate resin is a combination of bisphenol TMC as the component a with bisphenol M as the component b in which the molar ratio of the component a:component b is 30:70 to 80:20, particularly preferably 40:60 to 70:30.

Another preferred embodiment of the above copolycarbonate resin is a combination of bisphenol TMC as the component a with bisphenol C as the component b in which the molar ratio of the component a:component b is 30:70 to 80:20, particularly preferably 40:60 to 70:30.

In the above preferred embodiments, the total amount of the components a and b based on the total aromatic dihydroxy component amount is at least 80 mol %, preferably at least 90 mol %, and typically, a copolycarbonate resin from a dihydroxy component which substantially contains the components a and b is desirable.

In the above preferred embodiments, when the amount of the bisphenol TMC is less than 20 mol %, undesirably, the resin is liable to show a large stress optical coefficient and a decreased glass transition temperature.

In the dihydroxy component for the aromatic polycarbonate resin of the present invention, desirably, the total amount of the above components a and b Is at least 80 mol %, preferably at least 90 mol %. However, the dihydroxy component may contain other dihydroxy component (component c) in an amount of up to 20 mol %, preferably up to 10 mol %.

The above component c may be any one of dihydroxy components which are generally used for the production of an aromatic polycarbonate and other than the above components a and b. Examples of the component c include hydroquinone, resorcinol, 4,4'-biphenol, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl)-1-phenylethane, 1,1-bis(4-hydroxyphenyl)cyclohexane, 2,2-bis(4-hydroxyphenyl)pentane, 4,4'-(p-phenylenediisopropylidene)diphenol, 9,9-bis(4-hydroxyphenyl)fluorene, and 1,1-bis(4-hydroxyphenyl)-4-isopropylcyclohexane.

The aromatic polycarbonate resin of the present invention, used for the production of the optical disk substrate of the present invention, is produced by a known method for the production of a general aromatic polycarbonate resin, for example, by a method in which an aromatic dihydroxy component is reacted with a carbonate precursor such as phosgene or carbonate diester. The production method will be explained hereinafter.

The reaction using, e.g., phosgene as a carbonate precurose is generally carried out in the presence of an acid capture and a solvent. The acid capture is selected, for example, from alkali metal hydroxides such as sodium hydroxide and potassium hydroxide, and amine compounds such as pyridine. The solvent is selected, for example, from halogenated hydrocarbons such as methylene chloride and chlorobenzene. For promoting the reaction, a catalyst such as a tertiary amine or a quarternary ammonium salt may be used. The reaction temperature is generally 0° to 40° C., and the reaction time is several minutes to 5 hours.

The ester exchange reaction using carbonate diester as a carbonate precursor is carried out by a method in which a predetermined amount of the aromatic dihydroxy component and carbonate diester are stirred under heat in an inert gas atmosphere and formed alcohol or phenols are distilled off. Although differing depending upon boiling points of the formed alcohol or phenols, the reaction temperature is generally in the range of from 120° to 300° C. The reaction is carried out with distilling off the formed alcohol or phenols under reduced pressure from beginning to end. For promoting the reaction, a catalyst generally used for an ester exchange reaction may be used. Former carbonate diesters are chosen from diphenyl carbonate, dinaphthyl carbonate, bis(diphenyl) carbonate, dimethyl carbonate, diethyl carbonate and dibutyl carbonate. Among them, diphenyl carbonate is particularly preferred.

As described above, the aromatic polycarbonate resin of the present invention can be produced from an aromatic dihydroxy component containing bisphenol TMC or a mixture of bisphenol TMC with other aromatic dihydroxy component according to a polycarbonate-forming reaction known per se.

In the above polymerization, a monofunctional phenol generally used as an end group may be used. In the reaction using phosgene as a carbonate precursor in particular, the monofunctional phenol is generally used as an end group for adjusting the molecular weight of the aromatic polycarbonate resin, and the so-obtained aromatic polycarbonate resin is excellent in stability against heat since the chain end is blocked with a group derived from the monofunctional phenol, as compared with other aromatic polycarbonate resin of which the chain end is not so blocked.

The above monofunctional phenol can be selected from those phenols used as an end group for aromatic polycarbonate resins, and it is generally phenol or a lower alkyl-substituted phenol and has the following formula.

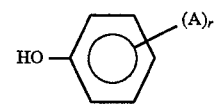

wherein A is hydrogen or an aliphatic hydrocarbon group having 1 to 9 carbon atoms, preferably 1 to 8 carbon atoms, and r is an integer of 1 to 5, preferably 1 to 3.

Specific examples of the above monofunctional phenol include phenol, p-tert butylphenol, p-cumylphenol and isooctylphenol.

The amount of the above monofunctional phenol introduced into the chain end of the aromatic polycarbonate resin is at least 5 mol %, preferably at least 10 mol % based on the total chain end amount.

According to the studies of the present inventors, the following has been also found. When the aromatic polycarbonate resin is chain end-blocked with a phenol having, as a substituent, a long-chain alkyl group or an aliphatic polyester group, benzoic acid chloride or a long-chain alkylcarboxylic acid chloride, these compounds not only work as an end group or a molecular weight adjuster as the above monofunctional phenol does, but also serve to modify the aromatic polycarbonate resin.

That is, the phenol having, as a substituent, a long-chain alkyl group or an aliphatic polyester group, benzoic acid chloride or long-chain alkylcarboxylic acid chloride (to be sometimes abbreviated as "chain end modifier" hereinafter to distinguish these from the above monofunctional phenol) bond to chain ends of the aromatic polycarbonate resin to improve the melt fluidity of the resin so that the resin is improved in processability, and further, the properties for the disk substrate are also improved. In particular, the above chain end modifier has an effect on decreasing the water absorption percentage of the resin.

When the amount of the bisphenol TMC based on the aromatic dihydroxy component amount is 80 mol % or more, particular 90 mol % or more, the resultant resin sometimes shows a water absorption percentage of more than 0.2% by weight, and in this case, the water absorption percentage can be decreased to 0.2% by weight or less by the use of the above chain end modifier. The above chain end modifier is naturally a monofunctional compound and works as a end group or a molecular weight adjuster as well.

Differing depending upon the composition of the aromatic polycarbonate resin, the amount of the above chain end modifier bonding to the chain end is at least 5 mol %, preferably at least 10 mol % based on the total chain end amount. The chain end modifier may be used in combination with the above monofunctional phenol.

The above chain end modifier can be selected from compounds of the following formulae [I-a] to [I-h].

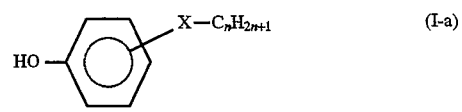 (I-a)

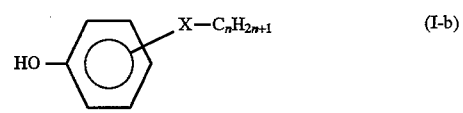 (I-b)

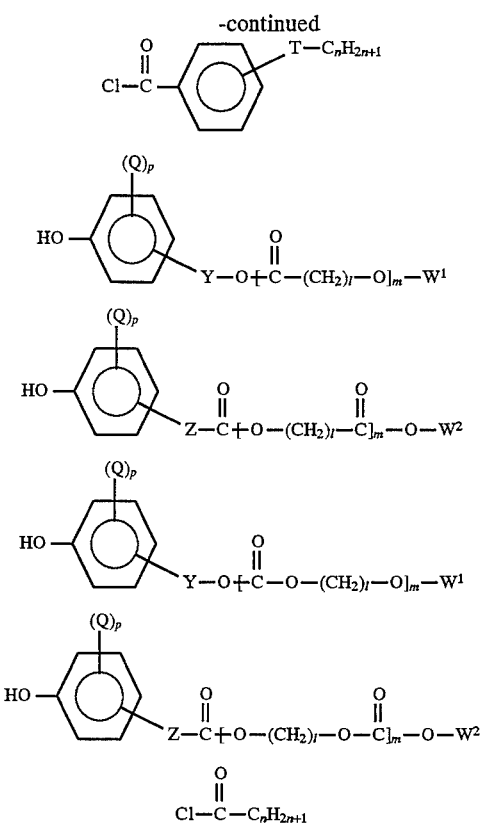

In the above formulae [I-a] to [I-h], X is —R—O—, —R—CO—O— or —R—O—CO— in which R is a single bond or a divalent aliphatic hydrocarbon group having 1 to 10 carbon atoms, preferably 1 to 5 carbon atoms, T is a single bond or the same bond as any one of the bonds defined as X, n is an integer of 10 to 50, Q is a halogen atom or a monovalent aliphatic hydrocarbon group having 1 to 10 carbon atoms, preferably 1 to 5 carbon atoms, p is an integer of 0 to 4, Y is a divalent aliphatic hydrocarbon group having 1 to 10 carbon atoms, preferably 1 to 5 carbon atoms, $W_1$ is —CO—$R_1$, —CO—O—$R_2$ or $R_3$ in which each of $R_1$, $R_2$ and $R_3$ is a monovalent aliphatic hydrocarbon group having 1 to 10 carbon atoms, preferably 1 to 5 carbon atoms, a monovalent alicyclic hydrocarbon group having 4 to 8 carbon atoms, preferably 5 or 6 carbon atoms or a monovalent aromatic hydrocarbon group having 6 to 15 carbon atoms, preferably 6 to 12 carbon atoms, $A$ is an integer of 4 to 20, preferably 5 to 10, m is an integer of 1 to 100, preferably 3 to 60, particularly preferably 4 to 50, Z is a single bond or a divalent aliphatic hydrocarbon group having 1 to 10 carbon atoms, preferably 1 to 5 carbon atoms, and $W^2$ is a hydrogen atom, a monovalent aliphatic hydrocarbon group having 1 to 10 carbon atoms, preferably 1 to 5 carbon atoms, a monovalent alicyclic hydrocarbon group having 4 to 8 carbon atoms, preferably 5 or 6 carbon atoms, or a monovalent aromatic hydrocarbon group having 6 to 15 carbon atoms, preferably 1 to 12 carbon atoms.

Of the above chain end modifiers [I-a] to [I-h], substituted phenols [I-a] and [I-b] are preferred. Of the substituted phenols [I-a], particularly preferred are those of the formula [I-a] in which n is 10 to 30, particularly 10 to 26. Specific examples thereof include decylphenol, dodecylphenol, tetradecylphenol, pentadecylphenol, hexadecylphenol, heptadecylphenol, octadecylphenol, nonadecylphenol, eicosylphenol, heneicosylphenol, docosylphenol, tricosylphenol, tetracosylphenol, pentacosylphenol, hexacosylphenol, heptacosylphenol, cotacosylphenol, nonacosylphenol and triacontylphenol.

Of the substituted phenols [I-b], proper are compounds of the formula [I-b] in which X is —R—CO—O— and R is a single bond, and preferred are compounds of the formula [I-b] in which n is 10 to 30, particularly 10 to 26. Specific examples thereof include decyl hydroxybenzoate, dodecyl hydroxybenzoate, tridecyl hydroxybenzoate tetradecyl hydroxybenzoate, pentadecyl hydroxybenzoate hexadecyl hydroxybenzoate, heptadecyl hydroxybenzoate octadecyl hydroxybenzoate, nonadecyl hydroxybenzoate eicosyl hydroxybenzoate, heneicosyl hydroxybenzoate docosyl hydroxybenzoate, tricosyl hydroxybenzoate tetracosyl hydroxybenzoate, pentacosyl hydroxybenzoate hexacosyl hydroxybenzoate, heptacosyl hydroxybenzoate octacosyl hydroxybenzoate, nonacosyl hydroxybenzoate and triacontyl hydroxybenzoate.

Of the above chain end modifiers, the chain end modifiers [I-a] and [I-b] are particularly excellent. The reason therefor is that not only these chain end modifiers improve the melt fluidity of the aromatic polycarbonate resin when they are introduced as a chain end group but also they have an effect on decreasing the water absorption percentage as already explained. When the amount of the bisphenol TMC based on the total aromatic dihydroxy component amount is large, e.g., 80 mol % or more, particularly 90 mol % or more, the resin sometimes shows a water absorption percentage of 0.2% by weight or more. In this case, the water absorption percentage can be decreased to 0.2% by weight or less by the use of the above chain end modifier [I-a] or [I-b]. However, it is needless to say that the above chain end modifier such as phenol or a phenolic compound having lower alkyl substituent may be used for the aromatic polycarbonate resin of the present invention so long as the amount of the bisphenol TMC is at least 20 mol %, preferably at least 30 mol %.

When 0.7 g of the aromatic polycarbonate resin is dissolved in 100 ml of methylene chloride, the aromatic polycarbonate resin is measured for a specific viscosity at 20° C. to show 0.2 to 0.5. When the specific viscosity Is less than 0.2, a molded article from the aromatic polycarbonate resin is fragile. When it is more than 0.5, the resin shows poor melt fluidity and defective moldability so that it is difficult to produce an optically excellent disk substrate.

The optical disk substrate of the present invention can be obtained by molding the above aromatic polycarbonate resin, for example, by any one of an injection molding method, a compression molding method, an extrusion method and a solution casting method, while the optical disk substrate of the present invention is preferably produced by an injection molding method.

When measured according to ASTM D-0570, the polycarbonate resin of the present invention is required to have a water absorption percentage of 0.2% by weight or less, preferably 0.18% by weight or less. When the water absorption percentage exceeds 0.2% by weight, undesirably, an optical disk obtained by forming a metal layer on the optical disk substrate is liable to undergo deflection due to the absorption of water and is liable to cause a tracking error. The water absorption percentage is particularly preferably 0.15% by weight or less.

The optical disk substrate of the present invention is produced from the aromatic polycarbonate resin having an oligomer content of 10% or less, preferably 7% or less, particularly preferably 5% or less. The oligomer content is measured by the following method using the following columns. That is, a column TSKgelG2000HXL and a column TSKgelG3000HXL, both supplied by Tosoh Corp., are connected in series, and chloroform is used as an eluent. Then the column is stabilized at a flow rate of 0.7 ml/minute of the eluent and then a solution of said polycarbonate resin in chloroform is injected. The oligomer content is a proportion of the total of oligomer peak areas after a retention time 19 minutes to the total peak area in GPC chart. This oligomer content is required to be 10% or less, preferably 7% or less. When the oligomer content exceeds the above upper limit, undesirably, the mold surface is sometimes stained when the resin is molded, and the staining degree tends to increase as the oligomer content increases. Meanwhile, the oligomer is more or less formed during the production of the aromatic polycarbonate resin, so it is impossible to decrease the oligomer content to zero (0).

The oligomer may be contained if its content does not exceed the above upper limit, and a small amount of the oligomer may be contained so long as the content of the oligomer is within the above value. When the oligomer content is 0.1% or more, preferably 0.15% or more, the aromatic polycarbonate resin shows improved melt fluidity over the aromatic polycarbonate resin of which the oligomer content is less than the above-described value. The oligomer content is therefore particularly preferably in the range of from 0.15 to 4 %.

For controlling the oligomer content of the aromatic polycarbonate resin into the above range, it is required to sufficiently complete the polymerization such that the resin does not contain a large amount of the oligomer, and it is also required to select a proper catalyst and proper polymerization conditions. When the oligomer content exceeds the above range, the oligomer may be removed, e.g., by extraction. The extraction may be carried out by a method in which a solution of the aromatic polycarbonate resin (e.g., methylene chloride solution) is added dropwise to a poor solvent or nonsolvent (e.g., acetone or methanol) to the resin or by a method in which the resin is immersed in the poor solvent or nonsolvent.

When the aromatic polycarbonate resin of the present invention is used for the production of an optical disk substrate, particularly an optical disk substrate for video, the amount of undissolved particles in the resin is required not to exceed a predetermined amount.

That is, a solution of 20 g of the polycarbonate resin in 1 liter of methylene chloride is measured by a laser sensor method using a liquid particle counter model 4100 (supplied by Hiac Royco Division of Pacific Co.), and scattered light is converted to scattered light of latex particles. In this measurement, the aromatic polycarbonate resin is required to satisfy that the number of undissolved particles having a diameter of at least 0.5 µm is up to 25,000 pieces or less per gram of the polycarbonate resin, and that the number of undissolved particles having a diameter of at least 1 µm is up to 500 pieces per gram of the polycarbonate resin. When the number of undissolved particles having a diameter of at least 0.5 µm exceeds 25,000 pieces or when the number of undissolved particles having a diameter of at least 1 µm exceeds 500 pieces, undesirably, information pits written in the optical disk are affected and the error rate increases. More preferably, the number of undissolved particles having a diameter of at least 0.5 µm is up to 20,000 pieces or less per gram of the polycarbonate resin, and that the number of undissolved particles having a diameter of at least 1 µm is up to 200 pieces per gram of the polycarbonate resin. Further, the number of undissolved particles having a diameter of 10 µm or more is required to be substantially zero.

For adjusting the number of undissolved particles in the aromatic polycarbonate resin to the above ranges, it is necessary to employ means by which undissolved particles are not included, or means by which undissolved particles can be removed, at the steps of polymerization and granulation.

As the means for the above purpose, for example, there are means of carrying out the operation in a clean room, means of using a granulation apparatus having a device for removing undissolved particles (specifically, a kneader of which the bearing portion has an isolating chamber having an outlet through which to withdraw the undissolved particles, used in Example 1 to be described later) or means of granulation with an apparatus structured so that resin particles are out of contact with a sliding portion (e.g., a granulator of a spray dryer type).

As other means of removing undissolved particles, there may be employed a method in which the resin is filtered through a fine-mesh filter (0.5 to 1 µm), or a method in which the resin is melted and then solid particles are removed through a metal filter (10 to 40 µm).

The optical disk substrate of the present invention is produced from the aromatic polycarbonate resin of which the total light transmittance is at least 85%, preferably at least 90%. When the total light transmittance is less than 85%, the optical disk substrate is improper as such. Further, properly, the retardation depending on incident angle phase difference of the aromatic polycarbonate resin is 60 nm or less, preferably 40 nm or less. When the substrate of the optical disk is formed of the aromatic polycarbonate resin having an retardation depending on incident angle phase difference of more than 60 nm, improperly, there is a problem in reading recorded data.

The aromatic polycarbonate resin having an stress optical coefficient of $60 \times 10^{-13}$ cm$^2$/dyne or less, preferably $50 \times 10^{-13}$ cm$^2$/dyne, can be advantageously used. When the resin has an stress optical coefficient greater than the above upper limit, the resin is not suitable for an optical disk.

The glass transition point of the aromatic polycarbonate resin Is preferably 120° C. or higher, more preferably 130° C. or higher, particularly preferably 145° C. or higher. When the above glass transition point is low, the heat resistance of the disk substrate is insufficient. Further, concerning the fluidity of the aromatic polycarbonate resin, the MFR value of the resin is preferably at least 25 g/10 minutes, more preferably at least 30 g/10 minutes, particularly preferably at least 45 g/10 minutes. When the fluidity is low, the resin is poor In processability so that desired disk substrates can no longer be obtained.

The aromatic polycarbonate resin of the present invention contains a little amount of residual chlorine after produced from phosgene as a carbonate precursor in the presence of a chlorine-containing solvent such as methylene chloride as a solvent. When the amount of the above residual chlorine is large, undesirably, the mold is corroded, the aromatic polycarbonate resin has decreased heat stability, or the metal layer of the optical disk is corroded. It is therefore desirable that the content of the above residual chlorine be up to 10 ppm, preferably up to 7 ppm, particularly preferably 5 ppm. The term "chlorine content" refers to a value obtained by measuring an aromatic polycarbonate resin by a combustion method using a total organic halogen analyzer TOX10 supplied by Mitsubishi Chemical Co., Ltd.

The aromatic polycarbonate resin of the present invention may contain a phosphorus-containing heat stabilizer as required. The phosphorus-containing heat stabilizer is selected from phosphite esters and phosphate esters.

Examples of the phosphite esters include triesters, diesters and monoesters of phosphorous acid such as triphenyl phosphite, trisnonylphenyl phosphite, tris(2,4-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl) pentaerythrltol diphosphite, 2,2-methylenebis(4,6-di-trt-butylphenyl)octyl phosphite, bis(nonylphenyl) pentaerythrltol diphosphite, bis(2,4-di-tert-butylphenyl) pentaerythritol diphosphite, and tetrakis(2,4-di-tert-butylphenyl)-4,4-diphenylene phosphonite. Of the above compounds, preferred are trisnonylphenyl phosphite, tris(2,4-di-tert-butylphenyl)phosphite and distearylpentaerythritol diphosphite.

Examples of the phosphate esters used as a heat stabilizer include tributyl phosphate, trimethyl phosphate, tricresyl phosphate, triphenyl phosphate, trichlorophenyl phosphate, triethyl phosphate, diphenylcresyl phosphate, diphenylmonoorothxenyl phosphate, tributoxyethyl phosphate, dibutyl phosphate, dioctyl phosphate and diisopropyl phosphate. Of these, preferred are triphenyl phosphate and trimethyl phosphate.

The above phosphorus-containing heat stabilizers may be used alone or in combination. The amount of the phosphorus-containing heat stabilizer based on the aromatic polycarbonate resin is properly 0.0001 to 0.05% by weight.

The aromatic polycarbonate resin of the present invention may contain a known antioxidant for the prevention of oxidation. Examples of the antioxidant include phenol-containing antioxidants such as triethylene glycol-bis(3-(3-tert-butyl-S-methyl-4-hydroxyphenyl)propionate, 1,6-hexanediol-bis(3-(3,5-di-tert-butyl-4-hydroxyphenyl) propionate, pentaerythritol-tetrakis(3-(3,5-di-tert-butyl-4-hydroxyphenyl)propionate, octadecyl-3-(3,5-di-tert-butyl-4-hydroxyphenyl)propionate, 1,3,5-trimethyl-2,4,6-tris(3,5-di-tert-butyl-4-hydroxylbenzyl)benzene, N,N-hexamethylene-bis(3,5-di-tert-butyl-4-hydroxyhydrocinnamide), 3,5-di-tert-butyl-4-hydroxybenzylphosphonate-diethyl ester, tris(3,5-di-tert-butyl-4-hydroxybenzyl)isocyanurate, and 3,9-bis{1,1-dimethyl-2-[β-(3-tert-butyl-4-hydroxy- 5-methylphenyl)propionyloxy]ethyl}-2,4,8,10-tetraoxaspiro(5,5)undecane. The amount of the antioxidant based on the aromatic polycarbonate resin is preferably 0.0001 to 0.05% by weight.

Further, the aromatic polycarbonate resin of the present invention may contain a higher fatty acid ester of a polyhydric alcohol as required. The higher fatty acid ester of a polyhydric alcohol improves the aromatic polycarbonate resin in heat resistance, improves the resin in fluidity at a molding time, and improves the molded substrate in releasability from a mold so that the deformation of the substrate can be prevented. The higher fatty acid ester of a polyhydric alcohol is preferably a partial ester or a whole ester of a polyhydric alcohol having 2 to 5 carbon atoms and a saturated fatty acid having 10 to 30 carbon atoms. The polyhydric alcohol includes glycols, glycerol and pentaerythritol.

The amount of the above higher fatty acid of the polyhydric alcohol based on the aromatic polycarbonate resin is 0.01 to 2% by weight, preferably 0.02 to 0.1% by weight.

When the above amount is less than 0.01% by weight, the above effects are not produced. When it exceeds 2% by weight, undesirably, the mold surface is stained.

The aromatic polycarbonate resin of the present invention may further contain additives such as a light stabilizer, a colorant, an antistatic agent and a lubricant in such amounts that the transparency is not impaired. Further, the aromatic polycarbonate resin of the present invention may contain other polycarbonate resin and a thermoplastic resin so long as the objects of the present invention are not impaired.

An optical disk is obtained by forming a thin layer of a metal on one surface of the optical disk substrate of the present invention. The metal is preferably selected from aluminum, Te, Fe, Co, Gd, SiN, $ZnS-SiO_2$, GeSbTe, ZnS and aluminum alloy. Aluminum is suitable therefor. The thin layer can be formed by any one of a sputtering method and a deposition method. The metal thin layer can be formed by a known method.

EXAMPLES

The present invention will be further explained hereinafter with reference to Examples, in which "part" stands for "part by weight" and "%" stands for "% by weight". The evaluations were carried out-by the following methods.

Specific viscosity

A polymer in an amount of 0.7 g was dissolved in 100 ml of methylene chloride, and the mixture was measured at 20° C.

Glass transition point

Measured with DSC 910 model supplied by E. I. du Pont de Nemours & Co.

Fluidity (MFR)

Measured with a semi-auto melt indexer supplied by Toyo Seiki Seisaku-Sho Ltd. according to JIS K-7210 at 280° C. under a load of 2.16 kg, and expressed in terms of the weight (g) of a polymer which flowed out for 10 minutes.

Oligomer content

A column TSKgelG2000HXL and a column TSKgelG3000HXL, both supplied by Tosoh Corp., were used, and while chloroform as an eluent was flowed at a flow rate of 0.7 ml/minute, 20 µl of a solution of 50 mg of a sample in 5 ml of chloroform was injected to obtain a GPC chart. The proportion of the total of peak areas of oligomer components after a retention time of 19 minutes to the total peak area in the GPC chart was expressed as %.

Water absorption percentage

Measured according to ASTM D-0570.

Undissolved particles in methylene chloride

A solution of 20 g of a polycarbonate resin in 1 liter of methylene chloride was determined by a method in which scattered light was converted to scattered light of latex particles with a laser sensor method using a particle counter model 4100 supplied by Hiac Royco Co.

Total light transmittance

Measured with Nippon Denshoku Sigma 80 according to ASTM D-1003.

Stress optical coefficient

Measured with an optical elasticity measuring apparatus PA-150 supplied by Riken.

Retardation depending on incident angle phase difference

Measured with an ellipsometer ADR-200B automatic birefringence measuring apparatus supplied by Oak Manufacturing Co., Ltd. at an incident angle of 30 degrees.

Deflection

An optical disk of which one surface was coated with an aluminum layer was allowed to stand in a 80° C. constant-temperature 85% RH constant-humidity chamber for 1,000 hours, and then the substrate was measured for a deflection with an optical disk tester LM-1200 supplied by Ono Sokki Co., Ltd.

BLER

An optical disk coated with aluminum layer was measured for a BLER (C1 peak) with CDP-3000 supplied by Sony.

Example 1

A reactor having a thermometer, a stirrer and a reflux condenser was charged with 929.2 parts of ion-exchanged water and 61.3 parts of a 48% sodium hydroxide aqueous solution, and 39 parts of 1,1-bis(4-hydroxyphenyl)-B,3,5-trimethylcyclohexane, 43.6 parts of 4,4'-(m-phenylenediisopropylidene)diphenol and 0.17 part of hydrosulfite were dissolved. Then, 1.51 parts of p-tert-butylphenol and 637.9 parts of methylene chloride were added, and 0.09 part of triethylamine was added. Then, while the mixture was stirred, 32.4 parts of phosgene was blown in at 14 to 25° C. over 40 minutes. After the introduction of the phosgene finished, 15.6 parts of 48% sodium hydroxide was added, and the mixture was stirred at 28° to 33° C. for 1 hour to complete the reaction. After the reaction finished, the product was diluted with methylene chloride, washed with water, made acidic with hydrochloric acid and then washed with water. When the electric conductivity of the aqueous phase became the same as that of ion-exchanged water, methylene chloride was evaporated with a kneader of which the bearing portion had an isolating chamber having an outlet through which to withdraw the undissolved particles, to give a 86.4 parts (yield 97%) of a colorless polymer comprising a bisphenol TMC:bisphenol M molar ratio of 50:50.

The above polymer had a specific viscosity of 0.286, an oligomer content of 2.3%, a Tg of 147° C. and an MFR of 70 g/10 minutes. It also showed a water absorption percentage of 0.15% by weight. The above polymer was pelletized after 0.003% of trisnonylphenyl phosphite, 0.005% of trimethyl phosphate and 0.04% of stearic acid monoglyceride were added, and the pellets were injection-molded with a DISK5MIII supplied by Sumitomo Heavy Industries, Ltd. to obtain a disk having a diameter of 120 mm and a thickness of 1.2 mm. In this disk, the number of undissolved particles having a diameter of 0.5 µm or greater in methylene chloride was 15,000 pieces/g, and the number of those having a diameter of 1 µm or greater in methylene chloride was 190 pieces/g. The above disk showed a total light transmittance of 89 4, a stress optical coefficient of $39 \times 10^{-13}$ cm$^2$/dyne, a retardation depending on incident angle phase difference of 20 nm, a deflection of 0.2 mm and a BLER of 45 pieces/second.

Example 2

86.4 Parts (yield 96%) of a polymer comprising a bisphenol TMC:bisphenol M molar ratio of 40:60 was obtained in the same manner as in Example 1 except that the amount of 1,1-bis(4-hydroxyphenyl)-3,3,5-trimethylcyclohexane was changed to 31.2 parts and that the amount of 4,4'-(m-phenylenediisopropylidene)diphenol was changed to 52.2 parts. This polymer had a specific viscosity of 0.292, an oligomer content of 2.8%, a Tg of 135° C. and an MFR of 90 g/10 minutes. It also showed a water absorption percentage of 0.12% by weight.

The above polymer was molded, and the resultant optical disk substrate was evaluated, in the same manner as in Example 1. The number of undissolved particles having a diameter of 0.5 µm or greater in methylene chloride was 13,000 pieces/g, and the number of those having a diameter of 1 µm or greater in methylene chloride was 140 pieces/g. The above disk showed a total light transmittance of 89%, a stress optical coefficient of $40 \times 10^{-13}$ cm$^2$/dyne, a retardation depending on incident angle phase difference of 24 nm, a deflection of 0.15 mm and a BLER of 38 pieces/second.

Example 3

86.4 Parts (yield 94%) of a polymer comprising a bisphenol TMC:bisphenol M molar ratio of 60:40 was obtained in the same manner as in Example 1 except that the amount of 1,1-bis(4-hydroxyphenyl)-3,3,5-trimethylcyclohexane was changed to 46.8 parts, that the amount of 4,4'-(m-phenylenediisopropylidene)diphenol was changed to 34.9 parts and that p-tert-butylphenol was replaced with 3.8 parts of an alkyl phenol having 23 carbon atoms (mixture of 70% ortho-substituted phenol and 30% para-substituted phenol). This polymer had a specific viscosity of 0.275, an oligomer content of 3.14, a Tg of 133° C. and an MFR of 68 g/10 minutes. It also showed a water absorption percentage of 0.16% by weight.

The above polymer was molded, and the resultant optical disk substrate was evaluated, in the same manner as in Example 1. The number of undissolved particles having a diameter of 0.5 µm or greater in methylene chloride was 16,000 pieces/g, and the number of those having a diameter of 1 µm or greater in methylene chloride was 170 pieces/g. The above disk showed a total light transmittance of 89%, a stress optical coefficient of $38 \times 10^{-13}$ cm$^2$/dyne, a retardation depending on incident angle phase difference of 20 nm, a deflection of 0.2 mm and a BLER of 33 pieces/second.

Example 4

The same reactor as that used in Example 1 was charged with 945 parts of ion-exchanged water and 62.5 parts of a 48.5% sodium hydroxide aqueous solution, and 16 parts of 1,1-bis(4-hydroxyphenyl)-3,3,5-trimethylcyclohexane, 9 parts of 9,9-bis(4-hydroxyphenyl)fluorene (to be sometimes referred to as "bisphenol fluorene" hereinafter) and 62.1 parts of 4,4'-(m-phenylenediisopropylidene)diphenol were dissolved. Then, 649 parts of methylene chloride was added, and 1.15 parts of p-tert-butylphenol and 0.09 part of triethylamine were added. While the mixture was vigorously stirred, 33 parts of phosgene was blown in at 20° C. over about 40 minutes to react the phosgene. Then, the temperature in the reactor was increased to 30° C., 16 parts of a 48.5% sodium hydroxide aqueous solution was added, and the mixture was stirred for 1 hour to finish the reaction.

The above-obtained reaction mixture was purified in the same manner as in Example 1 to give a polymer comprising a bisphenol TMC:bisphenol M:bisphenol fluorene molar ratio of 20:70:10. This polymer had a specific viscosity of 0.301, an oligomer content of 3.9 4, an MFR of 64 g/10 minutes and a Tg of 146° C. It also showed a water absorption percentage of 0.12% by weight.

The above polymer was molded, and the resultant optical disk substrate was evaluated, in the same manner as in Example 1. The number of undissolved particles having a diameter of 0.5 µm or greater in methylene chloride was 16,000 pieces/g, and the number 6f those having a diameter of 1 µm or greater in methylene chloride was 180 pieces/g. The above disk showed a total light transmittance of 89%, a stress optical coefficient of $40 \times 10^{-13}$ cm$^2$/dyne, a retardation depending on incident angle phase difference of 37 nm, a deflection of 0.15 mm and a BLER of 35 pieces/second.

Example 5

The same reactor as that used in Example 1 was charged with 965.1 parts of ion-exchanged water and 63.6 parts of a 48% sodium hydroxide aqueous solution, and 24.3 parts of 1,1-bis(4-hydroxyphenyl)-3,3,5-trimethylcyclohexane, 46.9 parts of 2,2-bis(3-methyl-4-hydroxyphenyl)propane and 0.18 part of hydrosulfite were dissolved. Then, 662.5 parts of methylene chloride was added. While the mixture was vigorously stirred, 32.4 parts of phosgene was blown in at 15 to 20° C. over about 40 minutes. After the phosgene was blown in, 2 parts of p-tert-butylphenol and 16.2 parts of a 48% sodium hydroxide aqueous solution were added to form an emulsion. Then, 0.09 part of triethylamine was added, and the mixture was stirred at 28° to 33° C. for 1 hour to finish the reaction. The reaction mixture was purified in the same manner as in Example 1 to give a polymer comprising a bisphenol TMC:bisphenol C molar ratio of 30:70 (yield 97%).

The above-obtained polymer had a specific viscosity of 0.304, an oligomer content of 3.8%, a Tg of 153° C. and an MFR of 50 g/10 minutes. It also showed a water absorption percentage of 0.16% by weight.

The above polymer was molded, and the resultant optical disk substrate was evaluated, in the same manner as in Example 1. The number of undissolved particles having a diameter of 0.5 µm or greater in methylene chloride was 14,000 pieces/g, and the number of those having a diameter of 1 µm or greater in methylene chloride was 150 pieces/g. The above disk showed a total light transmittance of 89%, a stress optical coefficient of $49 \times 10^{-13}$ cm$^2$/dyne, a retardation depending on incident angle phase difference of 25 nm, a deflection of 0.2 mm and a BLER of 40 pieces/second.

Example 6

83.8 Parts (yield 96%) of a polymer comprising a bisphenol TMC:bisphenol C molar ratio of 60:40 was obtained in the same manner as in Example 5 except that the amount of 1,1-bis(4-hydroxyphenyl)-3,3,5-trimethylcyclohexane was changed to 48.7 parts, that the amount of 2,2-bis(3-methyl-4-hydroxyphenyl)propane was changed to 26.8 parts and that p-tert-butylphenol was replaced with 5 parts of an alkyl phenol having 17 to 29 (average of 23) carbon atoms (mixture of 70% ortho-substituted phenol and 30 para-substituted phenol).

The above-obtained polymer had a specific viscosity of 0.293, an oligomer content of 3.7%, a Tg of 148° C. and an MFR of 45 g/10 minutes. It also showed a water absorption percentage of 0.18% by weight.

The above polymer was molded, and the resultant optical disk substrate was evaluated, in the same manner as in Example 1. The number of undissolved particles having a diameter of 0.5 µm or greater in methylene chloride was 15,000 pieces/g, and the number of those having a diameter of 1 µm or greater in methylene chloride was 170 pieces/g. The above disk showed a total light transmittance of 89%, a stress optical coefficient of $42 \times 10^{-13}$ cm$^2$/dyne, a retardation depending on incident angle phase difference of 20 nm, a deflection of 0.3 mm and a BLER of 45 pieces/second.

Example 7

The same reactor as that used in Example 1 was charged with 802 parts of ion-exchanged water and 71.7 parts of a 48% sodium hydroxide aqueous solution, and 64 parts of 1,1-bis(4-hydroxyphenyl)-3,3,5-trimethylcyclohexane, 3.8 parts of 4,4'-(m-phenylenediisopropylidene)diphenol and 0.14 part of hydrosulfite were dissolved. Then, 550.3 parts of methylene chloride was added. While the mixture was stirred, 28 parts of phosgene was blown in at 15 to 25° C. over about 40 minutes. After the phosgene was blown in, a solution of 4.9 parts of an alkyl phenol having 17 to 29 (average of 23) carbon atoms (mixture of 70% ortho-substituted phenol and 30% para-substituted phenol), 9 parts of a 48% sodium hydroxide aqueous solution and 0.6 parts of 1,1-bis(4-hydroxyphenyl)-3,3,5-trimethylcyclohexane in a mixture of 0.2 part of a 48% sodium hydroxide aqueous solution and 2 parts of ion-exchanged water was added to form an emulsion. Then, 0.08 part of triethylamine was added, and the mixture was stirred at 28° to 33° C. for about 1 hour to finish the reaction. The reaction mixture was purified in the same manner as in Example 1 to give a polymer comprising a bisphenol TMC:bisphenol M molar ratio of 95:5 (yield 97%).

The above-obtained polymer had a specific viscosity of 0.274, an oligomer content of 2.8%, a Tg of 178° C. and an MFR of 32 g/10 minutes. It also showed a water absorption percentage of 0.19% by weight.

The above polymer was molded, and the resultant optical disk substrate was evaluated, in the same manner as in Example 1. The number of undissolved particles having a diameter of 0.5 µm or greater in methylene chloride was 16,000 pieces/g, and the number of those having a diameter of 1 µm or greater in methylene chloride was 185 pieces/g. The above disk showed a total light transmittance of 89%, a stress optical coefficient of $35 \times 10^{-13}$ cm$^2$/dyne, a retardation depending on incident angle phase difference of 25 nm, a deflection of 0.3 mm and a BLER of 48 pieces/second.

Example 8

87.7 Parts (yield 96%) of a polymer comprising a bisphenol TMC:bisphenol M molar ratio of 55:45 was obtained in the same manner as in Example 1 except that the amount of 1,1-bis(4-hydroxyphenyl)-3,3,5-trimethylcyclohexane was changed to 43 parts, that the amount of 4,4'-(m-phenylenediisopropylidene)diphenol was changed to 39.2 parts and that p-tert-butylphenol was replaced with 1.9 parts of an alkyl phenol having 17 to 29 (average of 23) carbon atoms (mixture of 70% ortho-substituted phenol and 30% para-substituted phenol) and 0.8 part of p-tert-butylphenol.

The above-obtained polymer had a specific viscosity of 0.285, an oligomer content of 2.9%, a Tg of 140° C. and an MFR of 70 g/10 minutes. It also showed a water absorption percentage of 0.15% by weight.

The above polymer was molded, and the resultant optical disk substrate was evaluated, in the same manner as in Example 1. The number of undissolved particles having a diameter of 0.5 µm or greater in methylene chloride was 14,000 pieces/g, and the number of those having a diameter of 1 µm or greater in methylene chloride was 160 pieces/g. The above disk showed a total light transmittance of 89%, a stress optical coefficient of $39 \times 10^{-13}$ cm$^2$/dyne, a retardation depending on incident angle phase difference of 20 nm, a deflection of 0.15 mm and a BLER of 35 pieces/second.

Comparative Example 1

80.3 Parts (yield 95%) of a homopolymer of the bisphenol TMC was obtained in the same manner as in Example 1 except that the amount of 1,1-bis(4-hydroxyphenyl)-3,3,5-trimethylcyclohexane was changed to 78 parts and that 4,4'-(m-phenylenediisopropylidene)diphenol was not used.

The above-obtained polymer had a specific viscosity of 0.290 and a Tg of 232° C. It also showed a water absorption percentage of 0.3% by weight.

An attempt was made to produce a disk by injection-molding the above-obtained polymer, while the polymer had poor melt-fluidity so that no disk was formed.

Comparative Example 2

71.7 Parts (yield 98%) of a polymer comprising a bisphenol TMC:bisphenol A molar ratio of 50:50 was obtained in the same manner as in Example 1 except that 4,4'-(m-phenylenediisopropylidene)diphenol was replaced with 28.7 parts of 2,2-bis(4-hydroxyphenyl)propane.

The above-obtained polymer had a specific viscosity of 0.293, a Tg of 189° C. and an MFR of 4.5 g/10 minutes. It also showed a water absorption percentage of 0.3% by weight.

The above polymer was molded, and the resultant substrate was evaluated, in the same manner as in Example 1. The number of undissolved particles having a diameter of 0.5 μm or greater in methylene chloride was 16,000 pieces/g, and the number of those having a diameter of 1 μm or greater in methylene chloride was 195 pieces/g. The above disk showed a total light transmittance of 89%, a stress optical coefficient of $67 \times 10^{-13}$ cm²/dyne, a retardation depending on incident angle phase difference of 61 nm, a deflection of 0.35 mm and a BLER of 55 pieces/second.

Comparative Example 3

A polycarbonate resin (Panlight AD-5503, supplied by Teijin Chemicals Ltd.) obtained from bisphenol A, having a specific viscosity of 0.280, a Tg of 143° C. and an MFR of 65 g/10 minutes, was molded in the same manner as in Example 1 to prepare a molded piece, and the molded piece was evaluated in the same manner as in Example 1. It showed a water absorption percentage of 0.31%, a total light transmittance of 89 a stress optical coefficient of $82 \times 10^{-13}$ cm²/dyne, a retardation depending on incident angle phase difference of 68 nm and a deflection of 0.4 mm.

Comparative Example 4

88.2 Parts (yield 95%) of a polymer having a bisphenol TMC:bisphenol M molar ratio of 10:90 was obtained in the same manner as in Example 1 except that the amount of 1,1-bis(4-hydroxyphenyl)-3,3,5-trimethylcyclohexane was changed to 7.8 parts and that the amount of 4,4'-(m-phenylenediisopropylidene)diphenol was changed to 78.4 parts.

The above-obtained polymer had a specific viscosity of 0.286, a Tg of 115° C. and an MFR of 100 g/10 minutes. It also showed a water absorption percentage of 0.14% by weight.

The above polymer was evaluated in the same manner as in Example 1 to show a total light transmittance of 89%, a stress optical coefficient of $46 \times 10^{-13}$ cm²/dyne and a retardation depending on incident angle phase difference of 45 nm. However, the disk had a low Tg, as low as 115° C., and it was insufficient in heat resistance for use as a disk.

Comparative Example 5

The same polymer solution as that in Example 1was granulated, and a disk was produced, in the same manner as in Example 1 except that a general kneader of which the bearing portion had no isolation chamber for withdrawing the undissolved particles. The polymer and the disk were evaluated in the same manner as in Example 1. The number of undissolved particles having a diameter of 0.5 μm or greater in methylene chloride was as large as 86,000 pieces/g, and the number of those having a diameter of 1 μm or greater in methylene chloride was as large as 2,700 pieces/g. Therefore, the BLER value was as large as 480 pieces/second.

According to the present invention, there is provided an optical disk substrate having excellent optical properties. This substrate can be suitably used as a substrate for an optical disk, particularly, for video.

According to the present invention, there is also provided an aromatic polycarbonate resin having excellent properties, which can be advantageously used as a raw material not only for an optical disk substrate but also for other molded articles.

What is claimed is:

1. An optical disk substrate formed substantially of an aromatic polycarbonate resin from an aromatic dihydroxy component containing at least 20 mol % of 1,1-bis(4-hydroxyphenyl)-3,3,5-trimethylcyclohexane, wherein:
   - (A) the aromatic polycarbonate resin has a specific viscosity of 0.2 to 0.5 when measured in a solution of 0.7 g of the aromatic polycarbonate resin in 100 ml of methylene chloride at 20° C.,
   - (B) the aromatic polycarbonate resin shows a water absorption percentage, defined in the present specification, of 0.2% by weight or less,
   - (C) the aromatic polycarbonate resin has an oligomer content, measured by the method defined in the present specification, of 10% or less, and
   - (D) the number of undissolved particles having a diameter of 0.5 μm or greater is 25,000 pieces or less per g of the polycarbonate resin, and the number of undissolved particles having a diameter of 1 μm or greater is 500 pieces or less per g of the polycarbonate resin when the aromatic polycarbonate is measured in a methylene chloride solution.

2. The optical disk substrate of claim 1, wherein the aromatic polycarbonate resin is formed from the dihydroxy component containing 30 to 90 mol % of 1,1-bis(4-hydroxyphenyl)-3,3,5-trimethylcyclohexane.

3. The optical disk substrate of claim 1, wherein the aromatic polycarbonate resin is formed from the dihydroxy component containing 40 to 80 mol % of 1,1-bis(4-hydroxyphenyl)-3,3,5-trimethylcyclohexane.

4. The optical disk substrate of claim 1, wherein the aromatic polycarbonate resin is from an aromatic dihydroxy component which contains
   - (a) 1,1-bis(4-hydroxyphenyl)-3,3,5-trimethylcyclohexane (component a) and
   - (b) one or both of 4,4'-(m-phenylenediisopropylidene) diphenol and 2,2-bis(3-methyl-4-hydroxyphenyl) propane (component b), in which the total amount of the components a and b is at least 80 mol % based on the total aromatic dihydroxy component amount and the molar ratio of the component a:component b is 20:80 to 80:20.

5. The optical disk substrate of claim 4, wherein component b is 4,4'-(m-phenylenediisopropylidene) diphenol.

6. The optical disk substrate of claim 5, wherein the molar ratio of the component a:component b is 30:70 to 80:20.

7. The optical disk substrate of claim 4, wherein the component b is 2,2-bis(3-methyl-4-hydroxyphenyl)propane.

8. The optical disk substrate of claim 7, wherein the molar ratio of the component a:component b is 30:70 to 80:20.

9. The optical disk substrate of claim 1, wherein the aromatic polycarbonate resin has a specific viscosity in the range of from 0.25 to 0.40 when a solution of 0.7 g thereof in 100 ml of methylene chloride is measured for the specific viscosity at 20° C.

10. The optical disk substrate of claim 1, wherein the aromatic polycarbonate resin has a water absorption percentage, defined in the present specification, of 0.18% by weight or less.

11. The optical disk substrate of claim 1, wherein the aromatic polycarbonate resin has an oligomer content, defined in the present specification, of 7% or less.

12. The optical disk substrate of claim 1, wherein the aromatic polycarbonate resin shows that the number of undissolved particles having a diameter of 0.5 µm or greater is 20,000 pieces or less per g of the polycarbonate resin, and the number of undissolved particles having a diameter of 1 µm or greater is 200 pieces or less per g of the polycarbonate resin when the aromatic polycarbonate resin is measured in a methylene chloride solution.

13. The optical disk substrate of claim 1, wherein the aromatic polycarbonate resin has a total light transmittance of at least 85%.

14. The optical disk substrate of claim 1, wherein the aromatic polycarbonate resin has a retardation depending on incident angle phase difference value of 60 nm or less.

15. The optical disk substrate of claim 1, wherein the aromatic polycarbonate resin has a stress optical coefficient value of $60 \times 10^{-13}$ cm$^2$/dyne or less.

16. The optical disk substrate of claim 1, wherein the aromatic polycarbonate resin has a chlorine content of 10 ppm or less.

17. The optical disk substrate of claim 1, wherein at least 5 mol % of the total of chain ends of the aromatic polycarbonate resin are modified with substituted phenols of the formula [I-a] or [I-b],

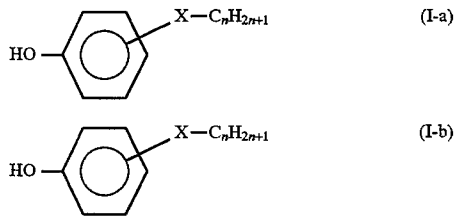

wherein X is —R—O—, —R—CO—O— or —R—O—CO— in which R is a single bond or a divalent aliphatic hydrocarbon group having 1 to 10 carbon atoms, and n is an integer of 10 to 50.

18. The optical disk substrate of claim 1, wherein the aromatic polycarbonate resin contains 0.0001 to 0.05% by weight, based on the resin, of a phosphorus-containing stabilizer.

19. The optical disk substrate of claim 1, wherein the aromatic polycarbonate resin contains 0.01 to 2% by weight of a partial ester or a whole ester of a polyhydric alcohol having 2 to 5 carbon atoms and a saturated fatty acid having 10 to 30 carbon atoms.

20. An optical disk produced by forming a metal thin layer on one surface of the optical disk substrate recited in claim 1.

21. An optical disk for video, produced by forming a metal thin layer on one surface of the optical disk substrate recited in claim 1.

22. An aromatic polycarbonate resin
(1) which is from an aromatic dihydroxy component containing at least 20 mol % of 1,1-bis(4-hydroxyphenyl)-3,3,5-trimethylcyclohexane,
(2) which has a specific viscosity of 0.2 to 0.5 when measured in a solution of 0.7 g of the aromatic polycarbonate in 100 ml of methylene chloride at 20° C., and
(3) which has a water absorption percentage, defined in the present specification, of 0.2% by weight or less.

23. The aromatic polycarbonate resin of claim 22, wherein the specific viscosity is 0.25 to 0.4.

24. The aromatic polycarbonate resin of claim 22, wherein the water absorption percentage is 0.18% by weight or less.

25. The aromatic polycarbonate resin of claim 22, wherein the aromatic dihydroxy component contains 30 to 90 mol % of the 1,1-bis(4-hydroxyphenyl)-3,3,5-trimethylcyclohexane.

26. The aromatic polycarbonate resin of claim 22, wherein the aromatic dihydroxy component contains 40 to 80 mol % of the 1,1-bis(4-hydroxyphenyl)-3,3,5-trimethylcyclohexane.

27. The aromatic polycarbonate resin of claim 22, wherein the aromatic dihydroxy component contains (a) 1,1-bis(4-hydroxyphenyl)-3,3,5-trimethylcyclohexane (component a) and (b) one or both of 4,4'-(m-phenylenediisopropylidene) diphenol and 2,2-bis(3-methyl-4-hydroxyphenyl) propane (component b), in which the total amount of the components a and b is at least 80 mol % based on the total aromatic dihydroxy component amount and the molar ratio of the component a:component b is 20:80 to 80:20.

28. The aromatic polycarbonate resin of claim 27, wherein the component b is 4,4'-(m-phenylenediisopropylidene)diphenol.

29. The aromatic polycarbonate resin of claim 28, wherein the molar ratio of the component a:component b is 30:70 to 80:20.

30. The aromatic polycarbonate resin of claim 27, wherein the component b is 2,2-bis(3-methyl-4-hydroxyphenyl)propane.

31. The aromatic polycarbonate resin of claim 30, wherein the molar ratio of the component a:component b is 30:70 to 80:20.

32. The aromatic polycarbonate resin of claim 22, wherein the aromatic dihydroxy component contains at least 80 mol % of 1,1-bis(4-hydroxyphenyl)-3,3,5-trimethylcyclohexane and at least 5 mol % of the total of chain ends of the aromatic polycarbonate resin are modified with substituted phenols of the formula [I-a] or [I-b],

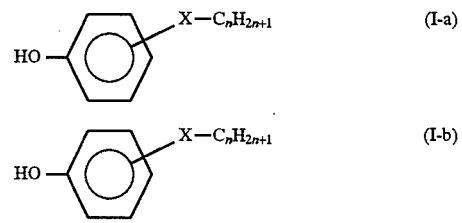

wherein X is —R—O—, —R—CO—O— or —R—O—CO— in which R is a single bond or a divalent aliphatic hydrocarbon group having 1 to 10 carbon atoms, and n is an integer of 10 to 50.

33. The aromatic polycarbonate resin of claim 32, wherein the aromatic dihydroxy component contains at least 90 mol % of 1,1-bis(4-hydroxyphenyl)-3,3,5-trimethylcyclohexane.

34. The aromatic polycarbonate resin of claim 32, wherein at least 10 mol % of the total of chain ends of the aromatic polycarbonate resin are modified with substituted phenols of the formula [I-a]or [I-b].

* * * * *